United States Patent
Townsend et al.

(10) Patent No.: US 8,595,909 B2
(45) Date of Patent: Dec. 3, 2013

(54) BOARD REMOVAL METHOD FOR A PALLET

(75) Inventors: Steve Townsend, Chatswood (AU); Christopher Bertram Anderson, Chatswood (AU)

(73) Assignee: Chep Technology Pty Limited (AU)

(*) Notice: Subject to any disclaimer, the term of this patent is extended or adjusted under 35 U.S.C. 154(b) by 0 days.

(21) Appl. No.: 13/543,181

(22) Filed: Jul. 6, 2012

(65) Prior Publication Data

US 2012/0284987 A1 Nov. 15, 2012

Related U.S. Application Data

(62) Division of application No. 12/019,815, filed on Jan. 25, 2008, now Pat. No. 8,266,790.

(51) Int. Cl.
*B23P 6/00* (2006.01)

(52) U.S. Cl.
USPC ......... 29/402.03; 29/426.1; 29/426.5; 29/791

(58) Field of Classification Search
USPC ............ 29/402.01, 402.03, 402.04, 402.06, 29/402.08, 426.1, 426.5, 700, 772, 791, 29/822, 823, 824
See application file for complete search history.

(56) References Cited

U.S. PATENT DOCUMENTS

| | | |
|---|---|---|
| 4,241,495 A | 12/1980 | Wakeem |
| 4,586,235 A | 5/1986 | Benvenuto |
| 4,743,154 A | 5/1988 | James et al. |
| 5,201,110 A | 4/1993 | Bane |
| 5,211,094 A | 5/1993 | Johnson |
| 5,307,554 A | 5/1994 | Johnson et al. |
| 5,323,525 A | 6/1994 | Johnson |
| 5,414,924 A | 5/1995 | Johnson et al. |
| 5,848,459 A | 12/1998 | Minick |
| 6,058,586 A | 5/2000 | Bowling et al. |
| 6,154,955 A | 12/2000 | Beane |
| 6,687,970 B2 | 2/2004 | Waechter et al. |
| 6,829,822 B1 | 12/2004 | Minick |
| 6,865,975 B2 | 3/2005 | Waechter et al. |
| 7,117,586 B2 | 10/2006 | Dykstra et al. |
| 7,954,240 B2 | 6/2011 | Holliger |
| 2006/0242820 A1 | 11/2006 | Townsend et al. |
| 2007/0143979 A1 | 6/2007 | Townsend et al. |
| 2007/0163099 A1 | 7/2007 | Townsend et al. |

*Primary Examiner* — Jermie Cozart

(74) *Attorney, Agent, or Firm* — Allen, Dyer, Doppelt, Milbrath & Gilchrist, P.A.

(57) ABSTRACT

A board removal apparatus for a wooden pallet includes a frame, and a carriage carried by the frame. The carriage includes a pair of spaced apart tables with a fixed gap therebetween. The carriage is movable between a pallet receiving position and a board removal position. The pallet is positioned on the carriage when in the pallet receiving position so that a board to be removed overlies the fixed gap. A board removal assembly is carried by the frame and includes a push rod and a board removal foot pad pivotally coupled thereto. The push rod and the board removal foot pad are inserted between adjacent stringers on the pallet when the carriage is in the board removal position.

18 Claims, 18 Drawing Sheets

| rpr_PALLETREPAIRSUMMARY | | | |
|---|---|---|---|
| CUSTOMER NAME | DATE TIME | LENGTH | ALLOW NAILS |
| PALLET | VALCHAR | 33 | |
| PALLET DEFECT | VALCHAR | 30 | |
| PALLET TYPE | VALCHAR | 10 | ✓ |
| ROW ID | INT | 4 | |

FIG. 8

| rpr_ELEMENTREPAIRSUMMARY | | | |
|---|---|---|---|
| CUSTOMER NAME | DATE TIME | LENGTH | ALLOW NAILS |
| PALLET | VALCHAR | 4 | |
| PALLETID | VALCHAR | 30 | |
| ELEMENTINDEX | INT | 4 | |
| DEFECT_TERMINDEX | INT | 4 | ✓ |
| DEFECT_DEFECTINDEX | INT | 4 | ✓ |
| DEFECT_MEASUREMENT | DECLINED | 5 | ✓ |
| ACTION_ACTIONINDEX | INT | 4 | ✓ |
| ROW ID | INT | 4 | |

FIG. 9

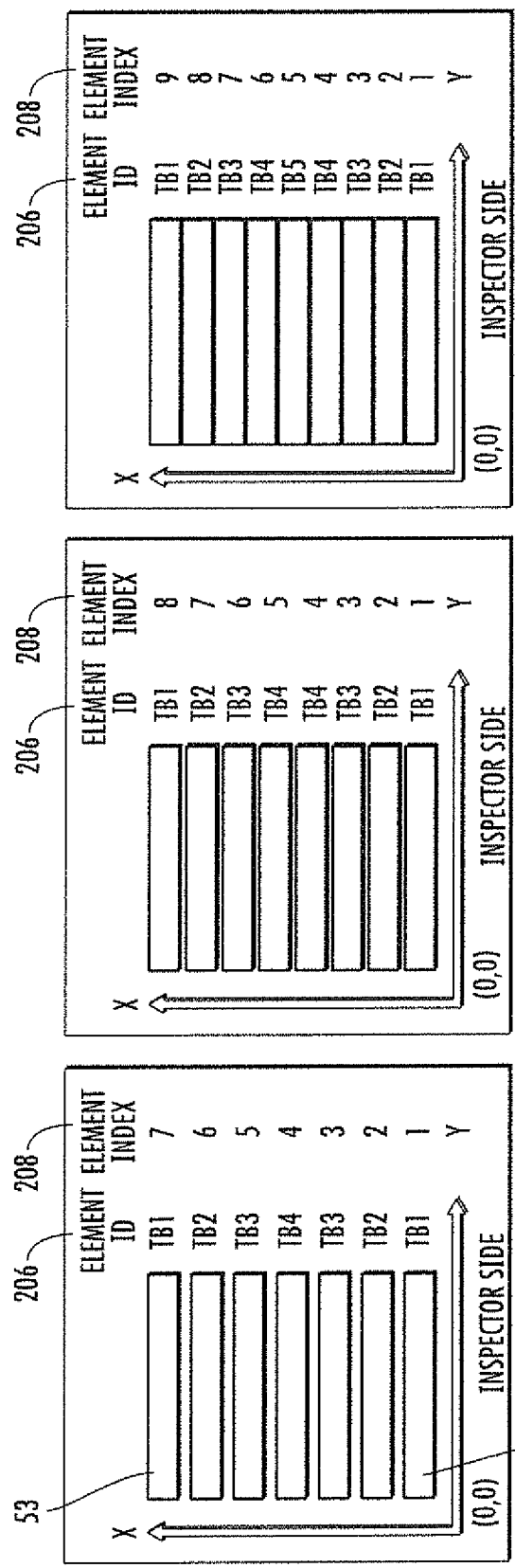

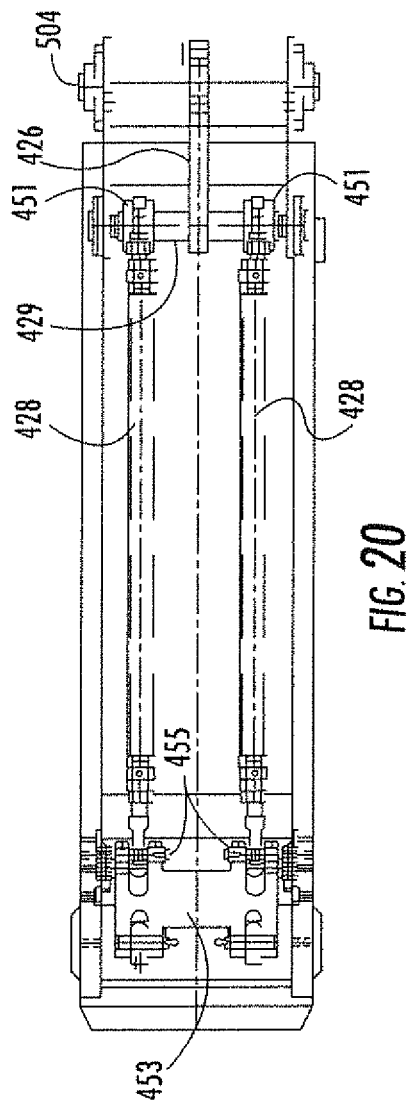
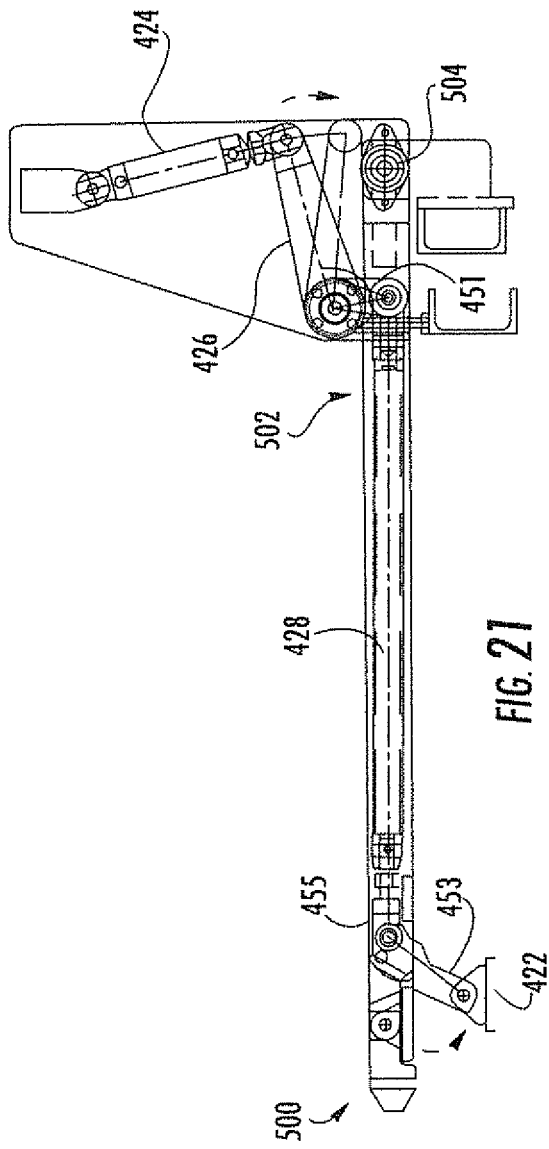

BOARD REMOVAL METHOD FOR A PALLET

RELATED APPLICATION

This is a divisional patent application of U.S. patent application Ser. No. 12/019,815 filed Jan. 26, 2008 now U.S. Pat. No. 8,266,790 B2, the entire disclosure of which is hereby incorporated herein by reference.

FIELD OF THE INVENTION

The present invention relates to pallet inspection and repair systems, and more particularly, to a pallet repair apparatus.

BACKGROUND OF THE INVENTION

Wooden pallets are used to transport a variety of bulk goods and equipment as required in manufacturing and warehousing operations. In high volume industries, pallet pools provide a lower total industry cost than one-way pallets. The current assignee of the present invention recognizes the benefits of pooled pallets, and currently has over several hundred million pallets that are pooled each year.

After the bulk goods and equipment are off loaded from the pooled pallets, the pallets are returned to pallet inspection and repair facilities for inspection, and if necessary, repair, before the pallets are returned to service.

As one might expect, wooden pallets are subject to damage in use that occurs from handling with forklifts or other like equipment. Since wooden pallets are in wide use, a large number of damaged and unusable pallets need to be repaired or discarded daily during the pallet inspection and repair process. Repair of damaged pallets has become an increasingly sound alternative to disposal due to the sheer volume of pallets that require repair each day.

Pallet inspection and repair traditionally requires manual handling and inspection by an operator, with mechanized systems available for moving pallets to and from the human operator who completes the repair of the pallets. An automated pallet inspection and repair system is advantageous because it does not rely on a human operator to perform the inspection and repair.

U.S. published patent application no. 2006/0242820 discloses an automated pallet inspection and repair system, which is assigned to the current assignee of the present invention and is incorporated herein by reference in its entirety. The automated pallet inspection and repair system discloses an automatic pallet inspection cell comprising multi-axis robot arms that terminate in either internal or exterior pallet grippers. A robot may be used to transport a gripped pallet through an automated pallet inspection station that generates a three-dimensional data map of a pallet surface. A processor interprets the map and generates a corresponding repair recipe.

One or more repair stations may conduct pallet repair operations that are specified by the repair recipe. For removing damaged or broken boards on the pallet, the '820 published patent application discloses a board removal machine comprising a stationary horizontal band saw. The pallet is positioned in such a way that the blade of the band saw is located between adjacent boards of the pallet. By linearly advancing the pallet toward the blade, the nails or other fasteners used to hold a board can be cut so that the board can be completely removed. While effective in removing boards from the pallet, there is a need to improve such a process.

SUMMARY OF THE INVENTION

In view of the foregoing background, it is therefore an object of the present invention to provide a board removal apparatus to be used in removing damaged boards from a pallet.

This and other objects, advantages and features in accordance with the present invention are provided by a board removal apparatus for a wooden pallet comprising a frame, and a carriage carried by the frame. The carriage may comprise a pair of spaced apart tables with a fixed gap therebetween, and may be movable between a pallet receiving position and a board removal position. The wooden pallet is positioned on the carriage when in the pallet receiving position so that a board to be removed overlies the fixed gap. The wooden pallet typically comprises a plurality of spaced apart stringers, and a plurality of boards on top and bottom surfaces thereof.

At least one board removal assembly may be carried by the frame and may comprise at least one push rod and at least one board removal foot pad pivotally coupled thereto. The at least one push rod and the at least one board removal foot pad may be inserted between adjacent stringers when the carriage is in the board removal position. The at least one board removal foot pad may overlie at least a portion of the board to be removed, and may also overlie at least a portion of the fixed gap between the pair of spaced apart tables.

The board removal apparatus may further comprise an upper support arm pad and a lower support arm. The upper support arm pad may be coupled to the frame for resisting an upward force of the wooden pallet when the at least one board removal foot pad applies a board removal force for removing the board. The lower support arm pad may be pivotally coupled to the frame to provide a counter force on the board to be removed as the at least one board removal foot pad applies the board removal force. The counter force is less than the board removal force for maintaining the board in a substantially horizontal position during removal thereof from the wooden pallet.

The board removal apparatus advantageously removes damaged boards from a pallet in an efficient and safe manner. This helps to increase productivity in repairing damaged pallets, as well as improving worker safety since a band saw or a crowbar type lever is not used by the worker to remove the damaged boards.

The at least one board removal assembly may further comprise at least one transfer plate pivotally coupled between the at least one board removal foot pad and the at least one push rod for transferring the board removal force to the at least one board removal foot pad. The at least one push rod may comprise a pair of push rods coupled to a transfer plate. The transfer plate preferably pivots the board removal foot pad to within the fixed gap between the pair of spaced apart tables. This allows the removed board to be easily discarded away from the pallet.

The at least one board removal assembly may further comprise at least one push rod link coupled to the at least one push rod, and at least one actuator coupled to the at least one push rod link for generating the board removal force. The at least one board removal assembly has a floating end and a fixed end coupled to the frame, with the floating end including the at least one board removal foot pad.

The at least one board removal assembly may further comprise a pair of spaced apart board removal assemblies, with each board removal assembly inserted between different adjacent stringers when the carriage is in the board removal position. The carriage may further comprise at least one pallet clamping mechanism carried by each table.

The lower support arm pad may be inserted in the fixed gap between the pair of spaced apart tables for contacting the board to be removed when the carriage is in the board removal position. At least one lower support arm actuator may be coupled between the frame and the lower support arm pad for providing the counter-force. After the board has been removed from the wooden pallet, the at least one lower support arm pad actuator may move the lower support arm pad within a range of about 30 to 60 degrees for discarding the removed board.

Another aspect of the present invention is directed to a method for removing a board from a pallet using a board removal apparatus as defined above. The method may comprise positioning the pallet on the carriage in the pallet receiving position so that the board to be removed overlies the fixed gap between the pair of spaced apart tables. The carriage may be moved to the board removal position, with the at least one push rod and the at least one board removal foot pad being inserted between adjacent stringers. The at least one board removal foot pad may overlie at least a portion of the board to be removed, and may also overlie at least a portion of the fixed gap between the pair of spaced apart tables. The at least one push rod may be moved for transferring a board removal force to the at least one board removal foot pad for removing the board from the pallet.

BRIEF DESCRIPTION OF THE DRAWINGS

FIGS. 8 and 9 respectively illustrate a pallet repair summary table and an element repair summary table generated by the ADI station in accordance with the present invention.

FIGS. 10, 11 and 12 respectively illustrate different configurations of the top deck boards of a pallet as well as element ID and indexing of the boards in accordance with the present invention.

FIG. 20 is a more detailed top view of one of the board removal assemblies illustrated in FIG. 19.

FIG. 21 is a side view of the board removal assembly illustrated in FIG. 20 with the board removal foot pad in an extended position.

DETAILED DESCRIPTION OF THE PREFERRED EMBODIMENTS

Figure 1:
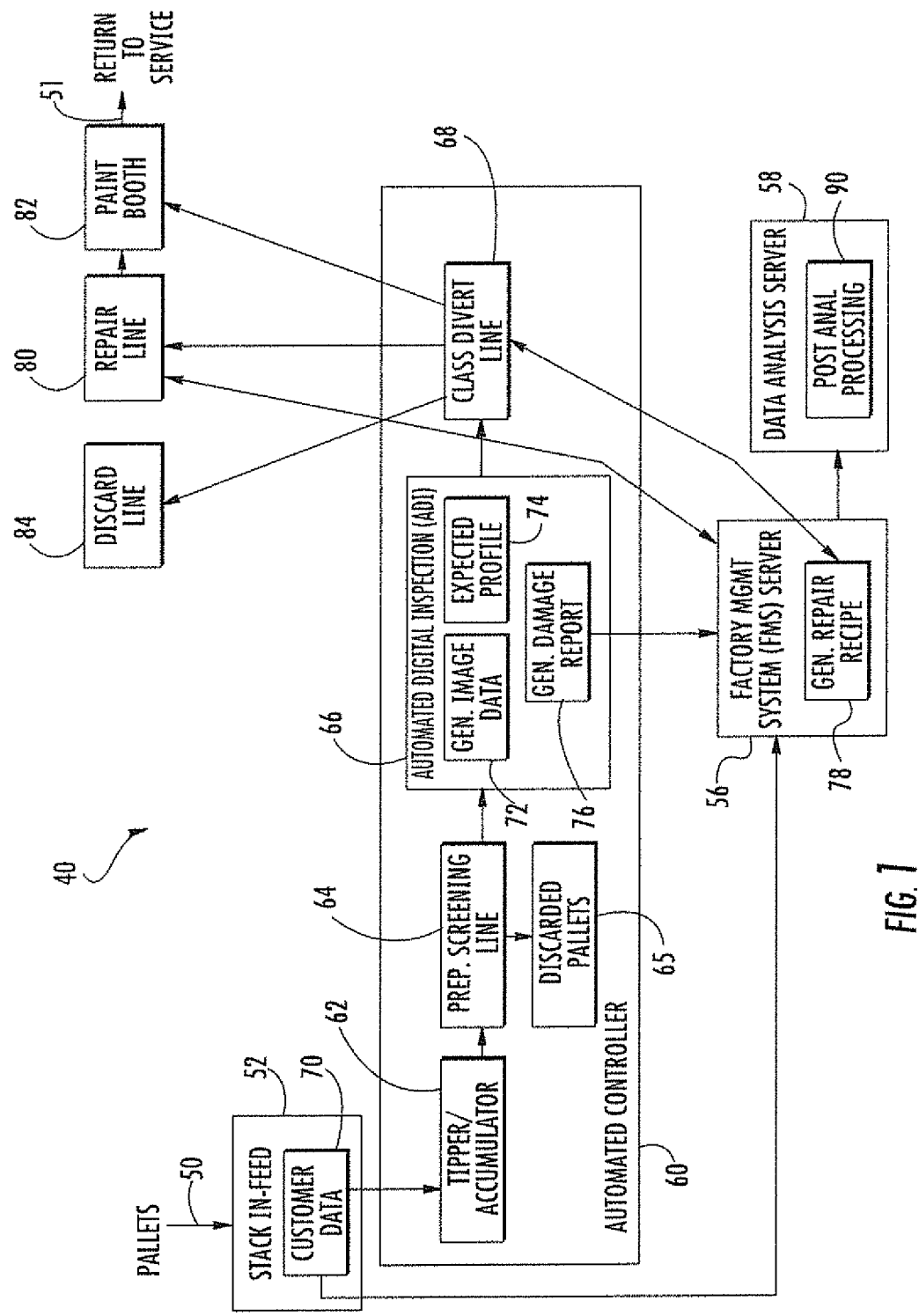
FIG. 1 is a top-level block diagram of a pallet inspection and repair system in accordance with the present invention.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

A top-level overview of the pallet inspection and repair system 40 will initially be discussed with reference to FIG. 1. Pooled pallets 50 from different customers are returned to a pallet pooling company for inspection, and if necessary, repair, before the pallets are returned to service 51. As the pallets 50 are received, customer data is collected and recorded. Customer data includes the customer providing the pallets, along with how many pallets are being returned. Customer data may also include other pertinent information about the customer, as readily appreciated by those skilled in the art.

Prior to inspection, the pallets 50 are provided to a stack in-feed 52. As the pallets 50 are placed in the stack in-feed 52, customer data 70 associated with the pallets are provided to at least one processor, referred to herein as a factory management system (FMS) server 56. As each pallet 50 is individually tracked through the pallet inspection and repair system 40 by an automated controller 60, the FMS server 56 keeps track of the corresponding customer data 70 to be associated therewith.

The stack in-feed 52 squares each stack of pallets before being passed to a tipper/accumulator 62. The tipper/accumulator 62 provides a steady stream of spaced apart pallets 50 for inspection by the automated digital inspection (ADI) station 66. As the pallets 50 leave the tipper/accumulator 62, they pass through a preparation screening line 64.

In the preparation screening line 64, each pallet 50 is visually inspected by a human operator to remove any loose debris or trash that may affect the ADI station 66. If necessary, the human operator will also make minor repairs. Each pallet 50 is individually tracked through the preparation screening line 64 by the automated controller 60. In some cases, a pallet 50 may be discarded during the preparation screening line 64 if it is damaged too badly, as indicated by block 65.

From the preparation screening line 64, each pallet 50 is inspected by the ADI station 66. The ADI station 66 may be configured as one or two inspection booths. As part of the inspection, image data 72 is generated for the pallet 50. The ADI station 66 compares the generated image data 72 to an expected profile 74. The generated image data 72 may also be referred to as measurement data, and the expected profile 74 may also be referred to as pallet classification. Based on the comparison, a damage report 76 is generated. As will be discussed in greater detail below, the damage report 76 comprises a pallet repair summary and an element repair summary.

The damage report 76 is sent to the FMS server 56. The FMS server 56 generates a repair recipe 78 for the inspected pallet 50 based on the damage report 76. During the pallet inspection and repair process, the information in the FMS server 56 (i.e., repair recipes 78) is queried. The inspected pallet 50 travels from the ADI station 66 to a classification divert line 68.

The classification divert line 68 may also be referred to as a sort line, and queries the FMS server 56 to determine if the inspected pallet is good or bad. If the inspected pallet 50 is bad, this means that the pallet requires repair (via repair line 80) or is to be discarded (via discard line 84). If the inspected pallet 50 is good, then the pallet 50 is sent to the paint booth 82 prior to being returned to service 51.

Prior to being sent to the repair line 80, the classification divert line 68 may position which way the pallets are to face for the repairs to be made. The repair line 80 includes a series of processor-controlled repair machines/repair devices available for repairing each pallet 50 based on the corresponding repair recipe 78, as will be discussed in greater detail below. Depending on how extensive the pallet 50 is damaged, the number of repair machines/repair devices involved in the repair can vary from one to more than one. In addition, certain repairs may be manually made by a human, as readily appreciated by those skilled in the art.

As illustrated in FIG. 1, the automated controller 60 controls the tipper/accumulator 62, the preparation screening line 64, the ADI station 66 and the classification divert line 68. In this portion of the pallet inspection and repair system 40, the pallets 50 are moved on a conveyor system, for example. A series of detectors, such as photocells, for example, are positioned along the conveyor system for tracking position and movement of each pallet. The automated controller 60 is a computer-based controller that tracks the position and movement of each pallet 50 via the sensors, and coordinates with the ADI system 66 on when the image data 72 of each pallet 50 is to be generated.

For each pallet 50, the corresponding customer data 70 and repair recipe 78 are provided from the FMS server 56 to another processor, which is referred to herein a data analysis server 58. The data analysis server 58 is illustrated as being separate from the FMS server 56. Alternatively, the FMS server 56 and the data analysis server 58 could be configured as a single server or processing system, as readily appreciated by those skilled in the art.

The data analysis server 58 performs post-analysis processing for the inspected pallets 50. This involves comparing the repair recipes 78 to determine performance repair parameters 90 for the pallets 50. The performance repair parameters 90 correspond to the different types of repairs to be made to the pallets.

As a result of analyzing the types of repairs being made to the pallets 50, statistical data can be collected including how many pallets are being repaired, how much time and lumber is being consumed or is expected to be consumed in repairing the pallets, as well as tracking what repairs are being made. This advantageously allows the throughput of the pallet inspection and repair system 40 to be monitored so that lumber and personnel can be accurately forecasted.

By determining certain repair trends, changes may be made to the pallet inspection and repair system 40 to more efficiently make the repairs. This may involve modifying one or more of the processor-controlled repair devices, or even the addition of a processor-controlled repair device if the repair was initially being manually made by a human operator.

Moreover, the repair trends may cause an examination of the inspection tolerances associated with the ADI station 66, for example. If one or more of the inspection tolerances are set to stringent, this may cause unnecessary repairs to be made to the pallets 50. By relaxing the inspection tolerances, less repairs would be made with the pallets 50 still meeting customer demands.

The performance repair parameters 90 may also be tracked with the customer data so that feedback can advantageously be provided to the customer. The feedback would allow corrective action to be taken by the customer to reduce certain types of repairs being made to the pallets provided by that customer.

By analyzing the types of repairs being made to the pallets for a particular customer, certain trends may be noted. For example, the customer may be damaging the supports blocks on the pallets more often than other customers, or the top deck boards are being replaced more often than other customers. Corrective action may be for the customer to instruct their forklift operators to reduce impacting the forklift tines with the support blocks, and to not stack loaded pallets too high on top of one another, for example. If the customer ignores the feedback, then the customer may be charged a higher rate on their pooled pallets.

Figure 2:
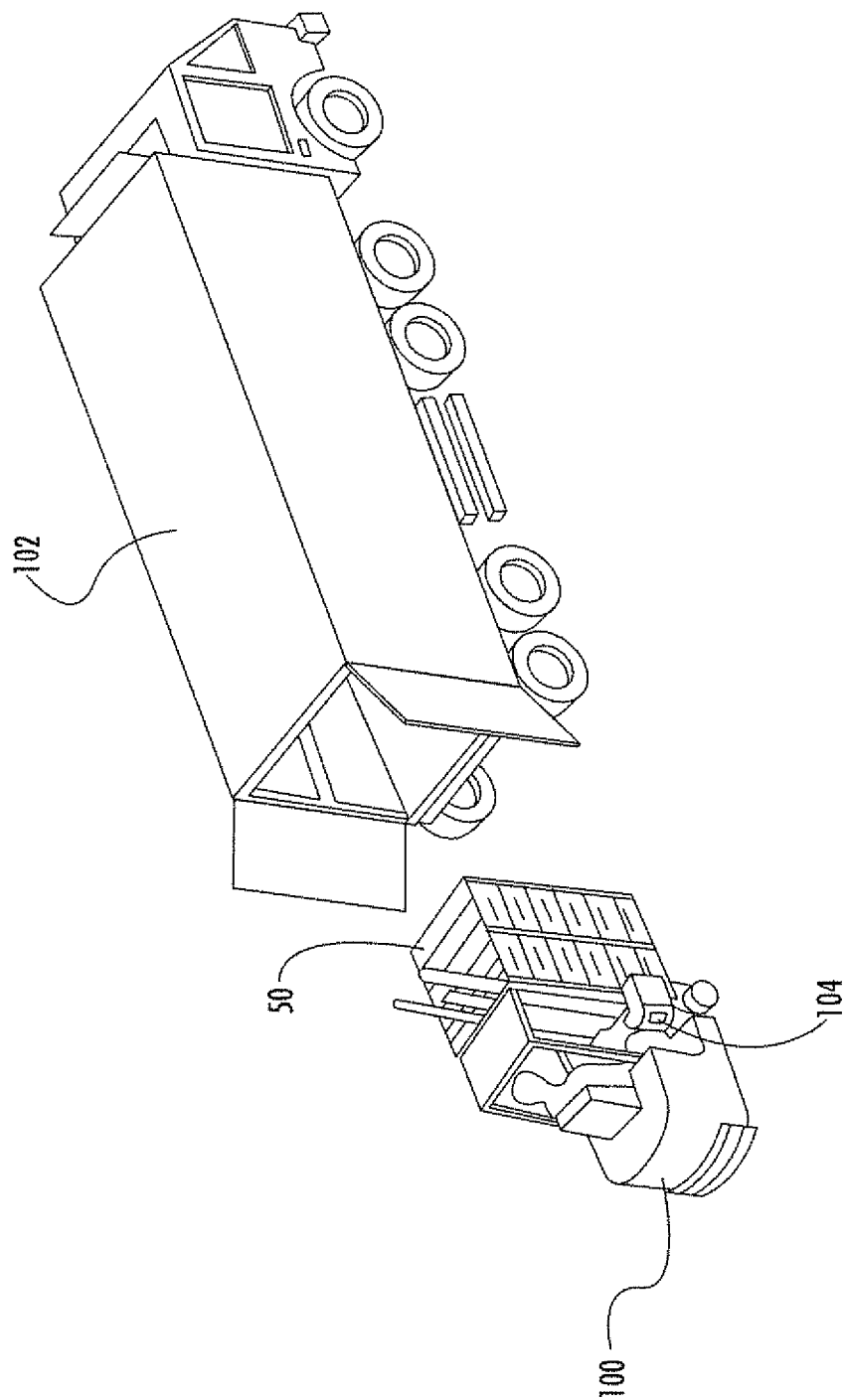
FIG. 2 illustrates a forklift removing pallets from a truck prior to inspection in accordance with the present invention.

The pallet inspection and repair system 40 will now be discussed in greater detail. Referring now to FIG. 2, a forklift 100 is used to unload wooden pallets 50 from a tractor-trailer truck 102. A standard tractor-trailer truck 102 holds about 500 pallets 50, for example. As the pallets 50 are unloaded, a vehicle mount terminal (VMT) 104 on the forklift 100 records the customer data 70. The customer data 70 includes the truck number, the customer providing the pallets 50, and how many pallets are being unloaded for inspection. The customer data 70 is entered into the VMT 104 by the operator of the forklift 100. This process is repeated each time pallets 50 are unloaded from a truck 102 or any other delivery vehicle.

Figure 3:
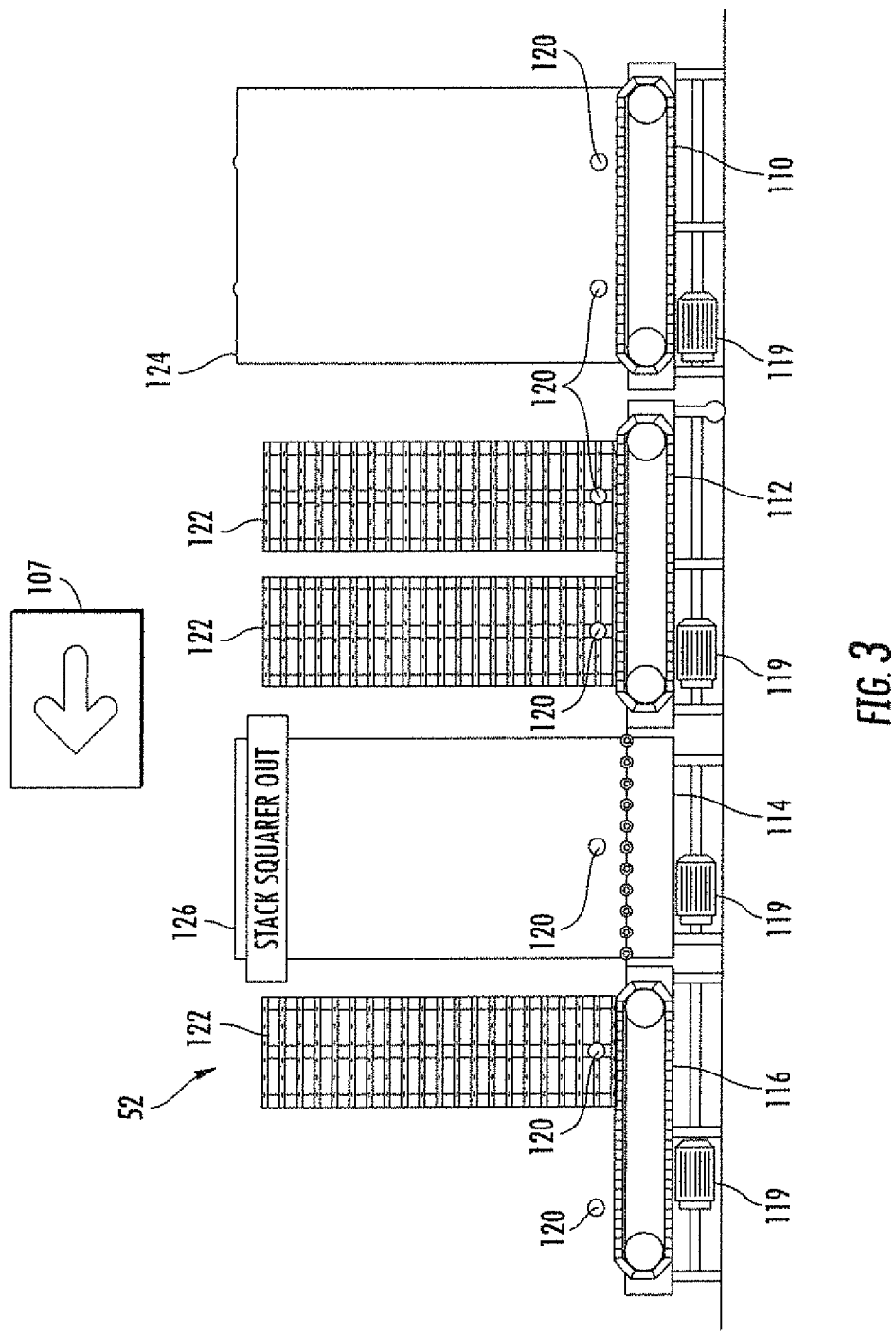
FIG. 3 is a schematic diagram of the stack in-feed illustrated in FIG. 1.

At the stack in-feed 52, the forklift 100 places the wooden pallets 50 against a backboard 124, as illustrated in FIG. 3. As the pallets 50 are stacked, the VMT 104 communicates with the FMS server 56. The FMS server 56 may also be referred to as a logistics database, for example.

The stack in-feed 52 comprises a series of conveyors 110, 112, 114 and 116, which are controlled by electrical motors 119. The illustrated arrow 107 indicates the flow direction of the pallets 50. Each conveyor has one or more detectors 120 for determining the position of a stack of pallets 122 as it moves along the conveyors 110, 112, 114 and 116. The detectors 120 may be photoelectric sensors, or photoeyes, for example. A photoelectric sensor is used to detect the presence of a stack of pallets 122 by using a light transmitter, often infrared, and a photoelectric receiver. Other types and forms of detectors 120 may be used, as readily appreciated by those skilled in the art.

The pallets 50 are initially stacked on a conveyor 110 against the backboard 124 to form a stack of pallets 122. Each illustrated stack of pallets 122 is 20 pallets high. After a stack of pallets 122 has been formed, the stack moves from conveyor 110 to a stack squarer 126 via conveyor 112. The stack squarer 126 squares each stack of pallets 122. After being squared, the conveyor 114 associated with the stack squarer 126 moves the stack of pallets 122 to an adjacent conveyor 116. This conveyor 116 then moves the stack of pallets 122 toward the tipper/accumulator 62.

Figure 4:
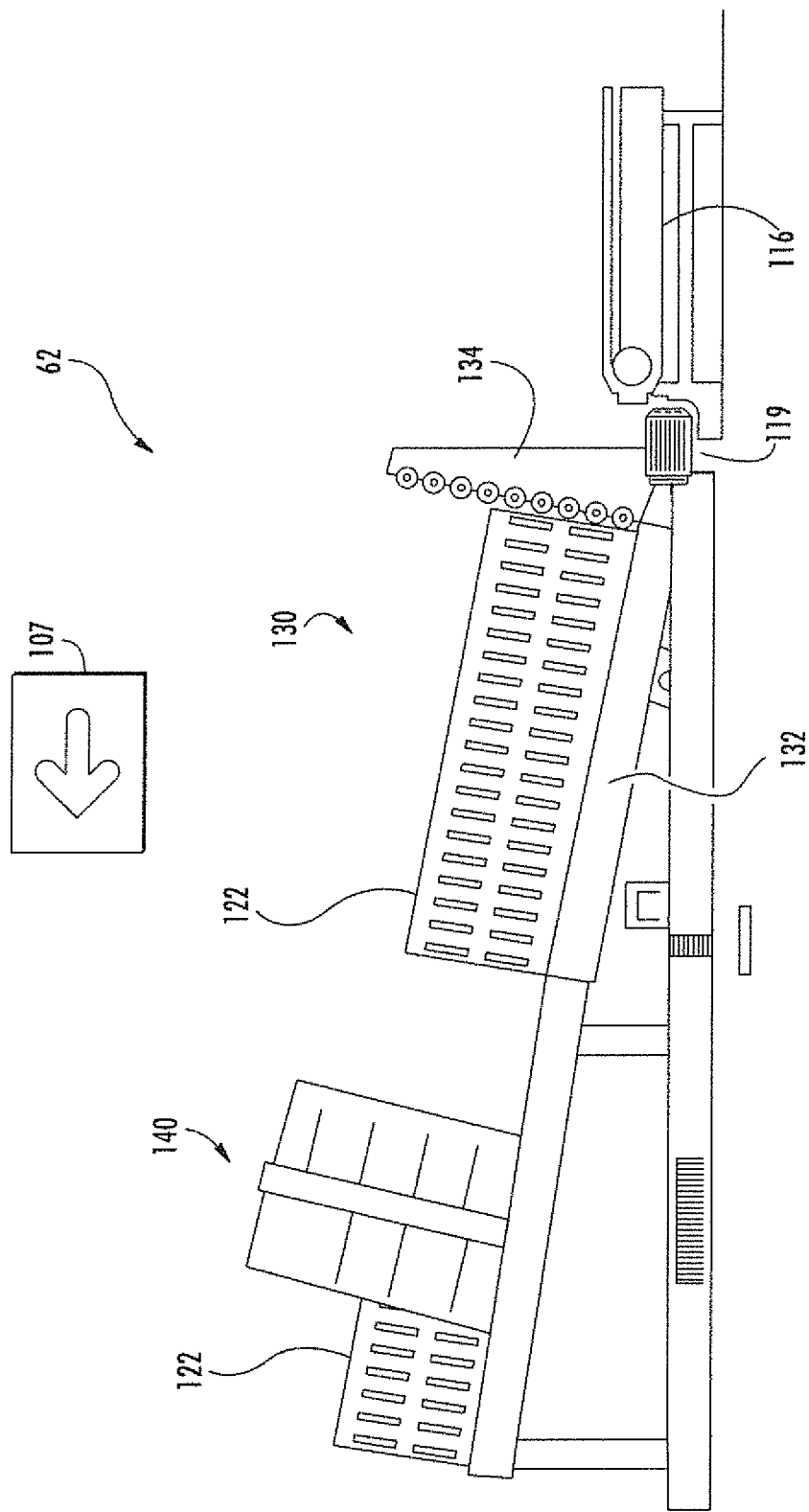
FIG. 4 is a schematic diagram of the tipper/accumulator illustrated in FIG. 1.

The tipper/accumulator 62 comprises a tipper 130 and an accumulator 140, as the name implies, as illustrated in FIG. 4. The illustrated arrow 107 indicates the flow direction of the pallets 50. The tipper 130 includes an L-shaped member that is tilted from a first position in which the long side 132 of the L-shaped member is upright and the short side 134 is horizontal, to a second position in which the long side 132 is near horizontal and the short side 134 is near vertical (as in FIG. 4). When the short side 134 of the L-shaped member is in the horizontal position, the stack of pallets 122 is loaded onto the tipper 140. After loading, the tipper 140 moves the L-shaped member to the second position in which the long side 132 of the tipper is nearly horizontally disposed so that the pallets 50 held on the L-shaped member can be moved off the tipper 130 to the accumulator 140.

The accumulator 140 provides an intermediate stage between the stack of pallets 122 and the preparation screening line 64. The tipper 130 delivers and transfers the stack of pallets 122 to the accumulator 140 which then holds and delivers the pallets 50 one at a time to the preparation screening line 64. This is while the tipper 130 returns to receive another stack of pallets 122.

Figure 5:
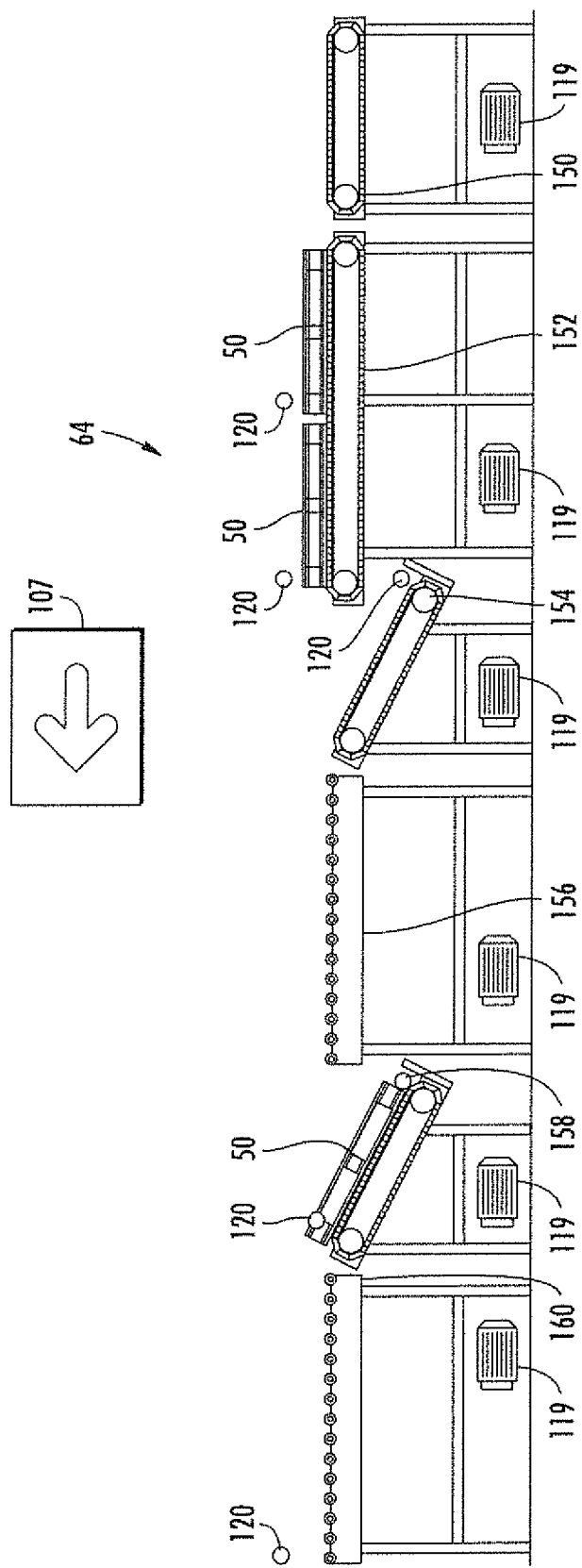
FIG. 5 is a schematic diagram of a preparation screening line for receiving pallets from the tipper/accumulator illustrated in FIG. 4.

At the output of the accumulator 140, the pallets 50 are passed to another series of conveyors 150, 152, 154, 156, 158 and 160 defining the preparation screening line 64, as illustrated in FIG. 5. The illustrated preparation screening line 64 is one example, and others variations are readily applicable. The illustrated arrow 107 indicates the flow direction of the pallets 50. Detectors 120 are spaced along the conveyors 150-160 for tracking the position of each pallet 50. The pallets 50 from the accumulator 140 are placed with the top deck facing up on conveyor 150. The top deck of each pallet 50 is visually inspected by a human operator to insure that any loose debris or trash is removed from the pallet 50 before reaching the ADI station 66. Also, any loose boards on the top deck that can be easily repaired may also be nailed down at this time. If the human operator determines that the pallet 50 is too damaged to be repaired, then the pallet is discarded at this point.

The pallets 50 travel along conveyor 152 and are then flipped because of the transition with conveyor 154 so that the bottom deck is now facing up. Likewise, the bottom deck of each pallet 50 is visually inspected by a human operator to insure that any loose debris or trash is removed from the pallets before reaching the ADI station 66. As with the top deck, any loose boards on the bottom deck that can be easily repaired may also be nailed down at this time. Again, if the human operator determines that the pallet 50 is too damaged to be repaired, then the pallet is discarded at this point.

The pallets 50 travel along conveyor 156 and are then flipped over at conveyor 158 so that the top deck is again facing up. This is so the ADI station 66 first inspects the top deck of each pallet 50. The pallets 50 continue moving on conveyor 160 toward the ADI station 66.

Figure 6:
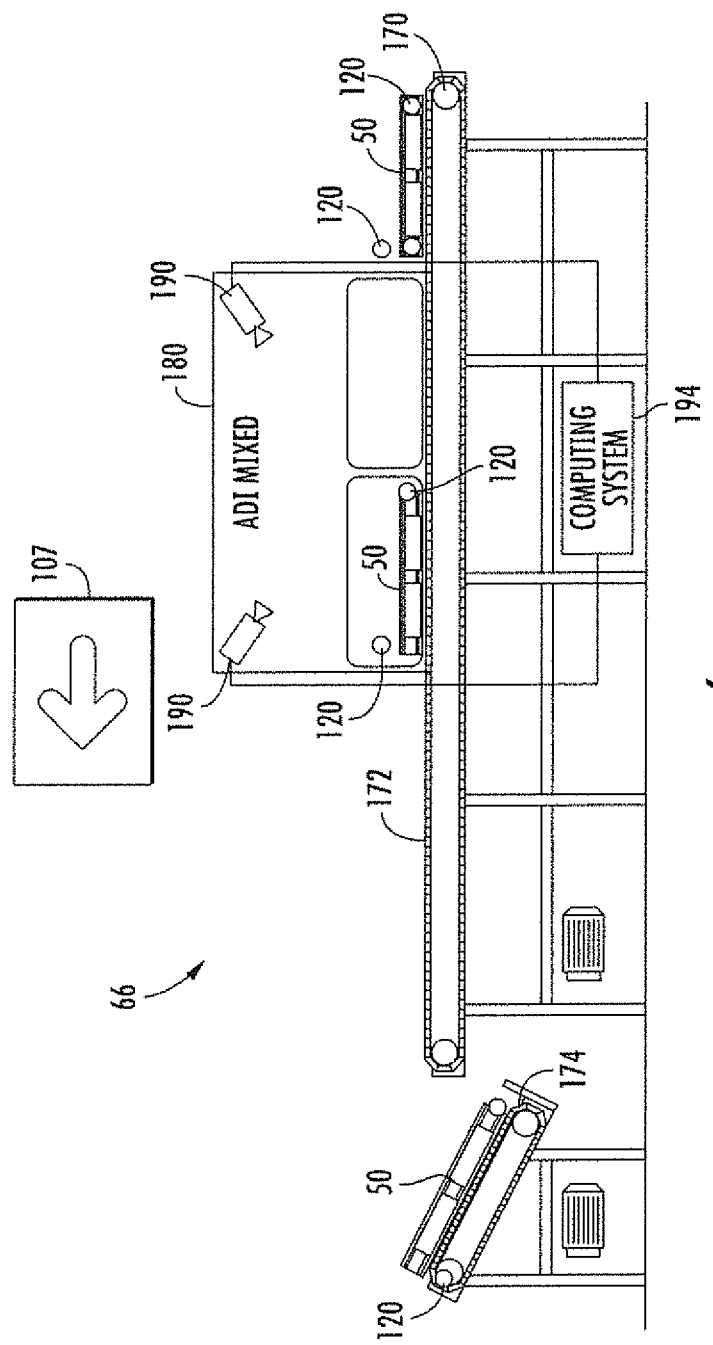
FIGS. 6 and 7 are schematic diagrams of the automated digital inspection (ADI) station illustrated in FIG. 1.
Figure 7:
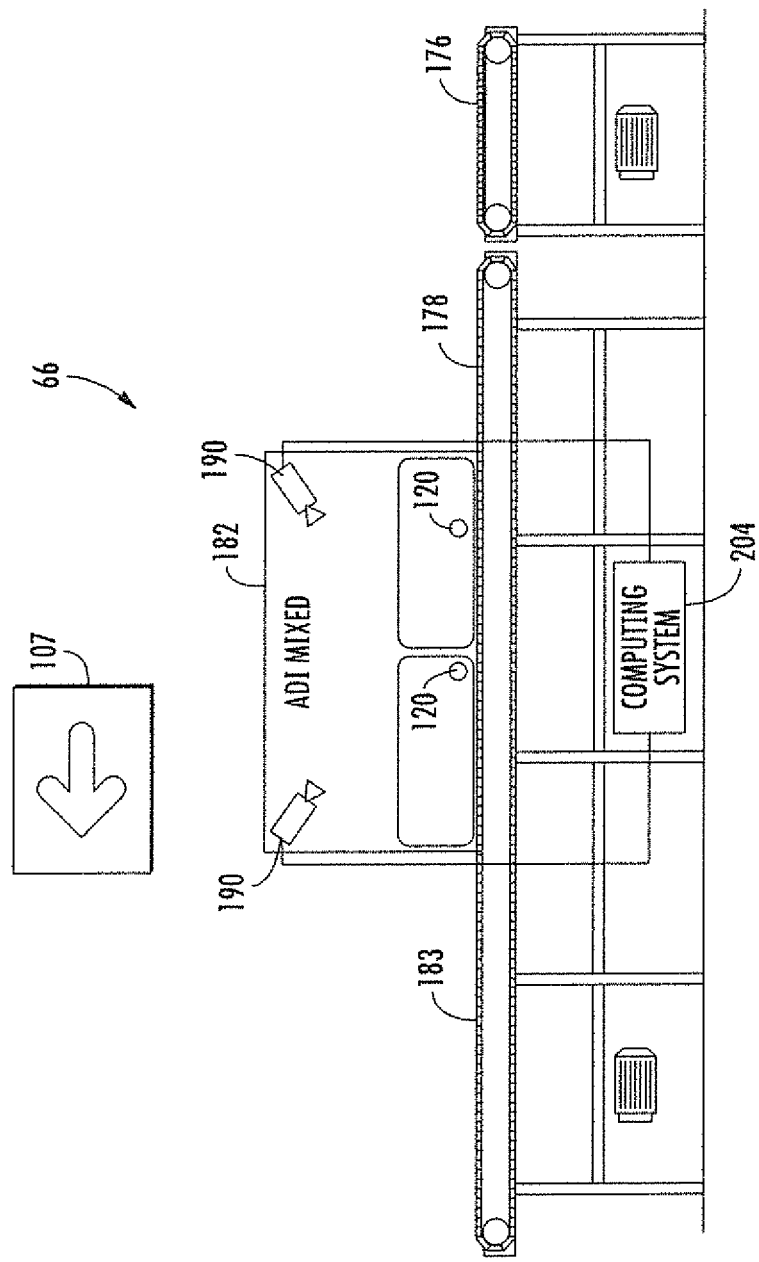

The next step in the pallet inspection and repair system 40 is to inspect the pallets 50, as illustrated in FIGS. 6 and 7. The illustrated embodiment for the ADI station 66 shown in FIG. 1 comprises a pair of ADI inspection stations 180, 182. The illustrated arrow 107 indicates the flow direction of the pallets 50.

During the inspection process, the top and bottom decks of each pallet 50 are inspected in separate ADI inspection stations 180, 182. Conveyor 170 receives a pallet 50 from conveyor 160 in the preparation screening line 64. The top deck of the pallet 50 is inspected in ADI inspection station 180. Detectors 120 are used to track movement of the pallet 50 prior to entering the ADI station 180, as well as tracking movement within the ADI station.

The ADI station 180 inspects the top deck of the pallet 50 using pallet feature sensing heads 190 placed above the pallet. Each pallet feature sensing head 190 may comprise a series of sensors in a line (linear array) to detect the presence or absence of timber (or other pallet material), as discussed in the above-referenced patent application that is incorporated herein by reference. This type of sensing head is positioned adjacent to the moving pallet 50 so that it scans the pallet surface passing near it for generating an image 72 of the pallet.

In another embodiment, the pallet feature sensing head 190 may comprise a laser and camera system to capture individual profiles (cross-sections) of the pallet 50 (i.e., the camera records the location of a projected laser line and triangulates its position to give height and coordinate data). The laser beam that is projected onto the pallet 50 may be fan shaped, or it may be scanned across the pallet surface using, for example, moving mirrors. Such a system will generate a three-dimensional digital data map on the pallet 50 and can be used for detecting gaps or protrusions such as nails, hanging wood, etc.

Alternatively, similar three-dimensional maps of pallet features, dimensions and topography may be created using a system of cameras, which may be stereoscopic or monocular in location and action. These can be mathematically manipulated to give data on each element that can then be analyzed for damage as in other pallet feature sensing head arrangements.

The ADI station 180 has at least one computing system 194 cooperating with the pallet feature sensing heads 190 for generating an image of the top deck of the pallet 50 being inspected. Likewise, the other ADI station 182 has at least one computing system 194 cooperating with the pallet feature sensing heads 190 for generating an image of the bottom deck of the pallet 50.

Between the ADI stations 180 and 182, conveyor 172 moves the pallet 50 to conveyor 174, wherein the transition between the two conveyors causes the pallet to flip over so that the bottom deck is facing up. The pallet 50 then moves on conveyors 176 and 178 to the ADI station 182 for inspecting the upper facing bottom deck.

Although not illustrated, the two computing systems 194 and 204 are coupled together for generating a damage report 76 on the pallet 50. The computing system 194 compares the generated image data 72 for the top and bottom decks of the pallet 50 with expected profiles 74 for generating the damage report 76.

The damage report 76 comprises a pallet repair summary and an element repair summary. The pallet repair summary and the element repair summary may be configured as tables, as illustrated in FIGS. 8 and 9. The element repair summary corresponds to the elements making up the pallet 50. For example, the top deck of the pallet 50 could be formed with 5, 6 or 7 boards as illustrated in FIGS. 10, 11 and 12. Accordingly, when a pallet 50 is to be inspected, the pallet needs to be classified as a 5, 6 or 7 board pallet. The corresponding element ID 206 and element index 208 for each type of pallet are also provided.

Figure 14:
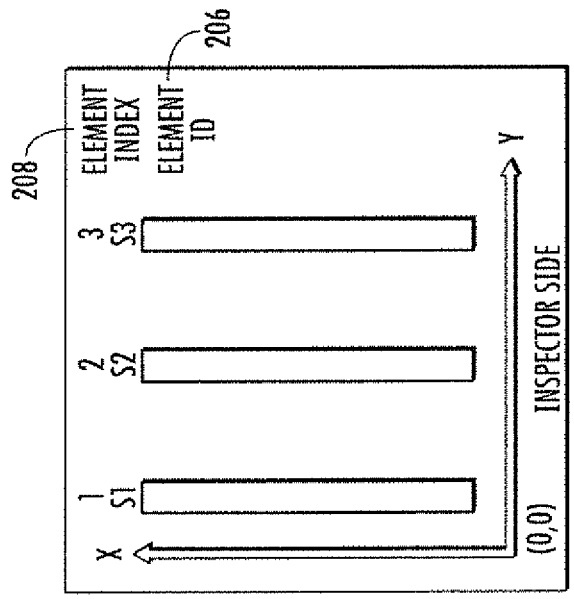
FIG. 14 illustrates the stringers of a pallet as well as element ID and indexing of the boards in accordance with the present invention.
Figure 13:
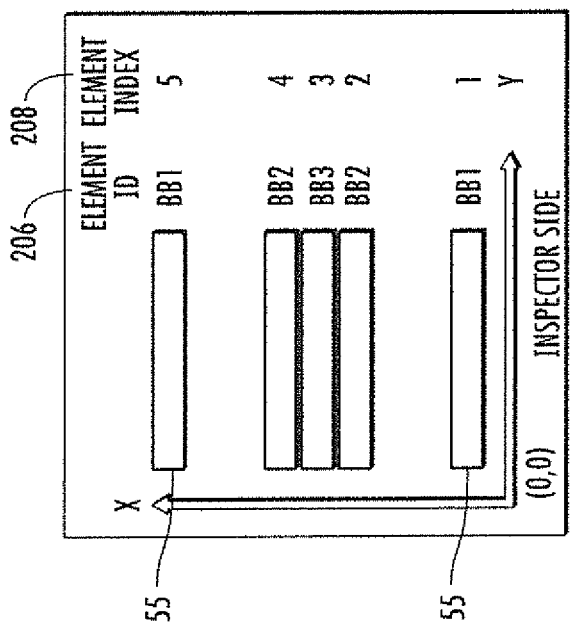
FIG. 13 illustrates the bottom deck baseboards of a pallet as well as element ID and indexing of the boards in accordance with the present invention.

Once the pallet 50 has been classified, then the expected profile can be selected by the computing systems 194, 204. Similarly, the elements making up the bottom deck of the pallet 50, and the elements making up the stringer boards of the pallets are illustrated in FIGS. 13 and 14. The corresponding element ID 206 and element index 208 for the pallet are also provided.

As an alternative to separate ADI stations 180 and 182, a single ADI station may be used when pallet feature sensing heads 190 are positioned below the conveyor. In this embodiment, the pallet 50 does not have to be flipped over so that the bottom deck is facing up during inspection. In addition, a single computing system 194 may be used.

As illustrated in FIG. 1, the damage report is provided to the FMS server 56. Since the damage report 76 includes the pallet repair summary table and the element repair summary table as illustrated in FIGS. 8 and 9, the FMS server 56 generates a repair recipe 78 for the pallet 50.

The repair recipe 78 determines how the pallet 50 is to be repaired if it is damaged. The repair recipe 78 takes into account the inspection results, the complexity of the repair and the repair machines available and the paths available (with respect to the repair machines) in the pallet inspection and repair system 40. The repair recipe 78 also takes into consideration what repair operations get priority if multiple repairs have to be made to the pallet 50. The FMS server 56 thus creates a relational database scheme for handling the very large number of repair variables that are possible when repairing pallets 50.

Figure 15:
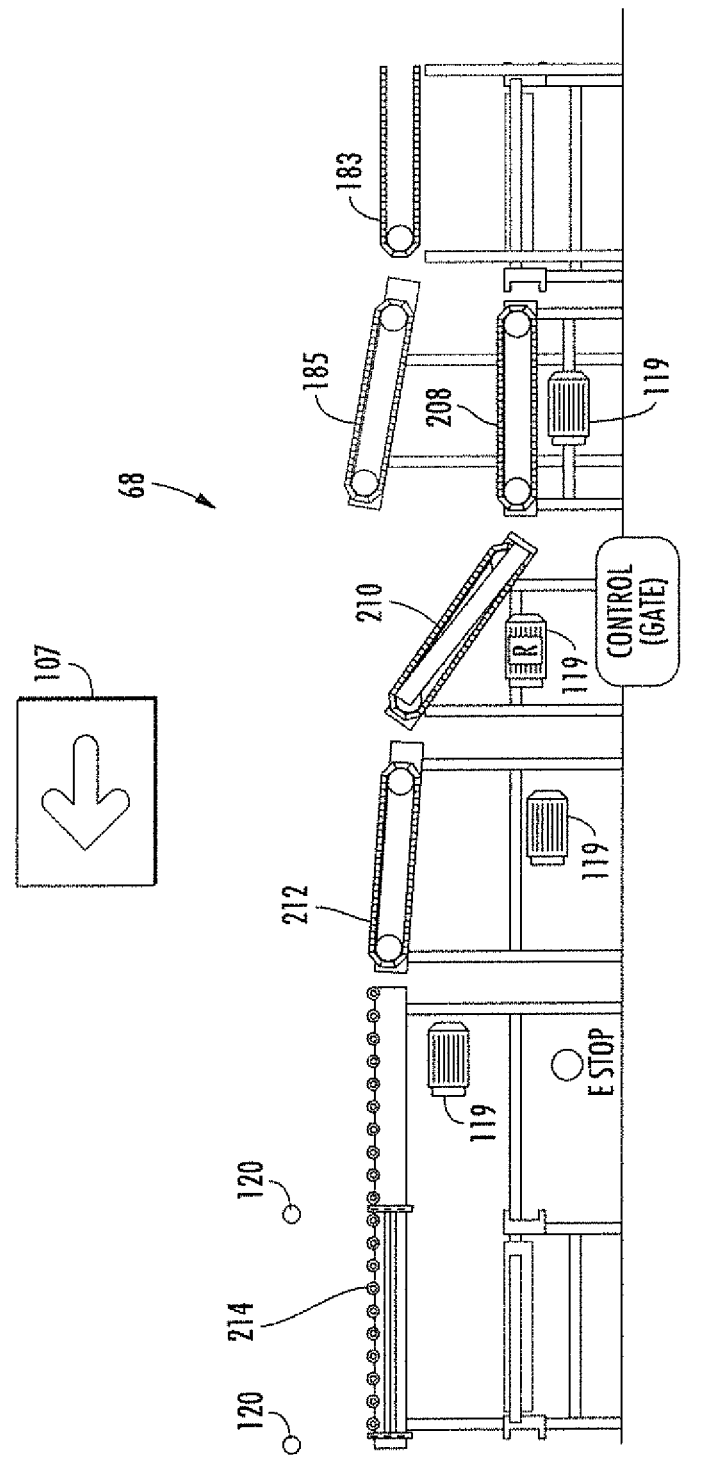
FIG. 15 is a schematic diagram of the classification divert line illustrated in FIG. 1.
Figure 16:
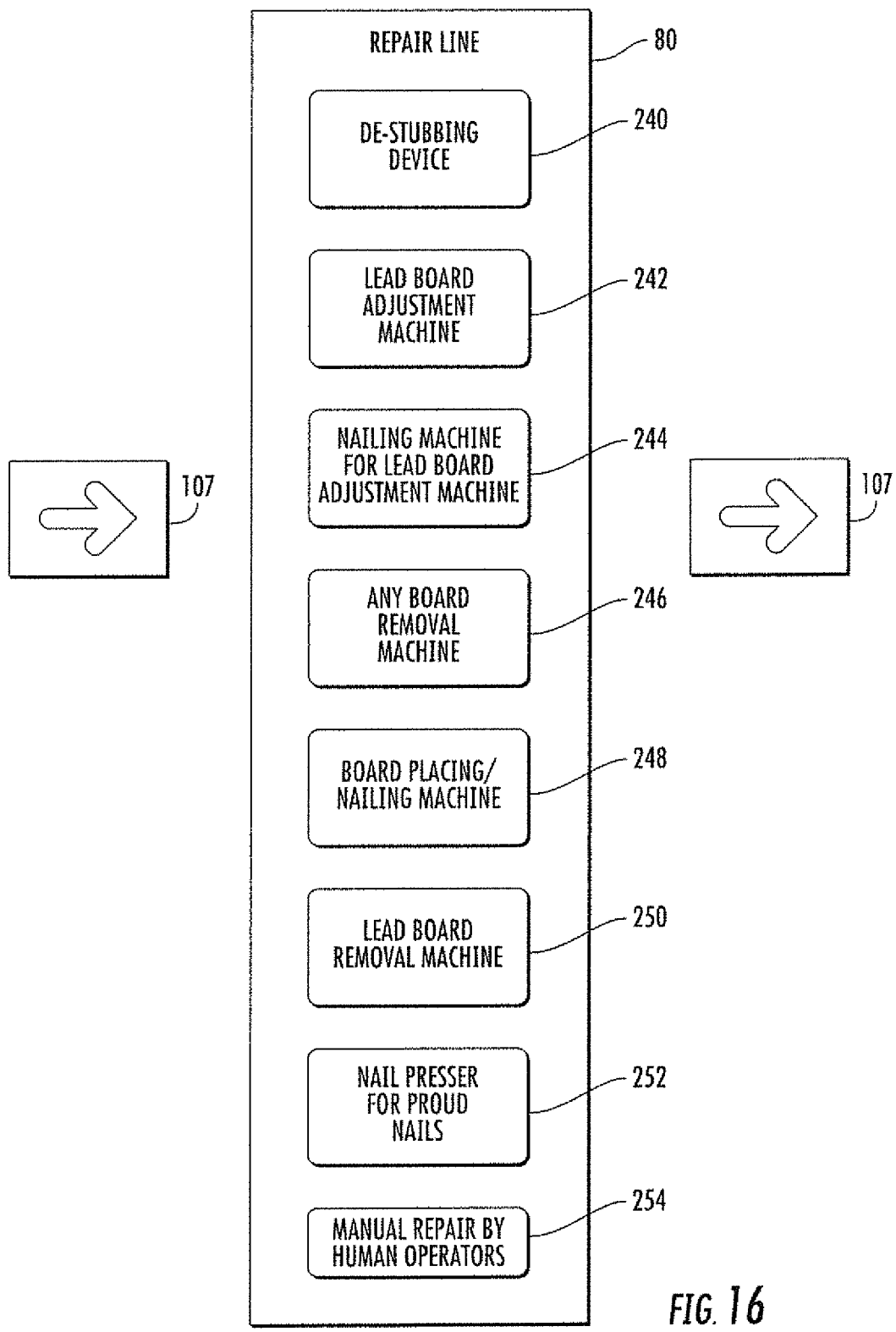
FIG. 16 is a more detailed block diagram of the different repair machines/repair devices associated with the repair line illustrated in FIG. 1.

Conveyor 180 moves the pallet 50 from the second ADI station 182 to the classification divert line 68, as illustrated in FIG. 15. The classification divert line 68 includes a conveyor 185 for receiving the pallet 50 from the second ADI station 182. Conveyor 210 operates as a control gate for directing the pallet 50 to conveyor 212 or to conveyor 208. Conveyor 212 provides the pallet 50 to conveyor 214 which directs the pallet to the repair line 80. Conveyor 208 provides the pallet 50 to the paint booth 82. Although not illustrated, the classification divert line 68 also directs the pallet to the discard line 84 if the pallet 50 is too damaged to be repaired. The classification divert line 68 thus operates based on the repair recipe 78.

In the repair line 80, a number of different processor-controlled repair devices and repair machines are available to support a complete repair of a pallet 50. The repair line 80 includes the following: a de-stubbing device 240, a lead board adjustment apparatus or machine 242, a nailing machine 244 for the lead board adjustment machine, an any board removal apparatus or machine 246, a board placing/nailing machine 248, a lead board removal machine 250 and a nail presser for proud nails 252. In addition, some repairs may be manually made by a human, either directly or with the human operating a repair machine, as indicated by reference 254. The order in which a pallet 50 is repaired in the repair line 80 is based on the generated repair recipe 78.

The repair recipe 78 may be provided to the repair line 80 in a number of different ways. For example, the position of each pallet 50 is still being tracked so that the repair recipe 78 "travels" with each pallet. Alternatively, each pallet 50 may be physically marked with their repair recipe 78 before leaving the classification divert line 68. This may be in the form of a bar code, or as a set of written instructions. Once the pallet 50 arrives at the repair line 80, the repair recipe 78 is read. The repair recipe 78 may be read by a processor or by a human operator.

As part of the repair line 80, one or more robot cells may be used to position each pallet 50 among the different repair devices/machines based on the repair recipe 78. Alternatively, conveyors with switch gates may be used for providing the pallets 50 to the appropriate repair devices/machines based on the repair recipe 78.

After a pallet 50 has been repaired, or for a pallet that did not need repair, the pallet may be sent to the paint booth 82 before being returned to service. In one embodiment, several pallets 50 are placed in the paint booth 82 at one time. The paint booth 82 is enclosed, and the pallets 50 spin as edges or sides of the pallets are sprayed with paint. Next, a stencil may be used to mark the pallets with indicia, such as the company logo. In one embodiment, a robot is used for dipping its paint guns into a pit of paint for marking at least two pallets at a time. An alternative design is to use an inkjet type paint sprayer to spray in a dot matrix format the indicia.

In the discard line 84, the pallets 50 are dismantled. A robot, for example, may be programmed to dismantle the pallets 50.

Another aspect of the pallet inspection and repair system 40 is directed to the board removal apparatus or machine 246, which is used to remove damaged boards from a pallet 50. The board removal apparatus 246 may also be referred to as an any board removal apparatus.

Figure 17:
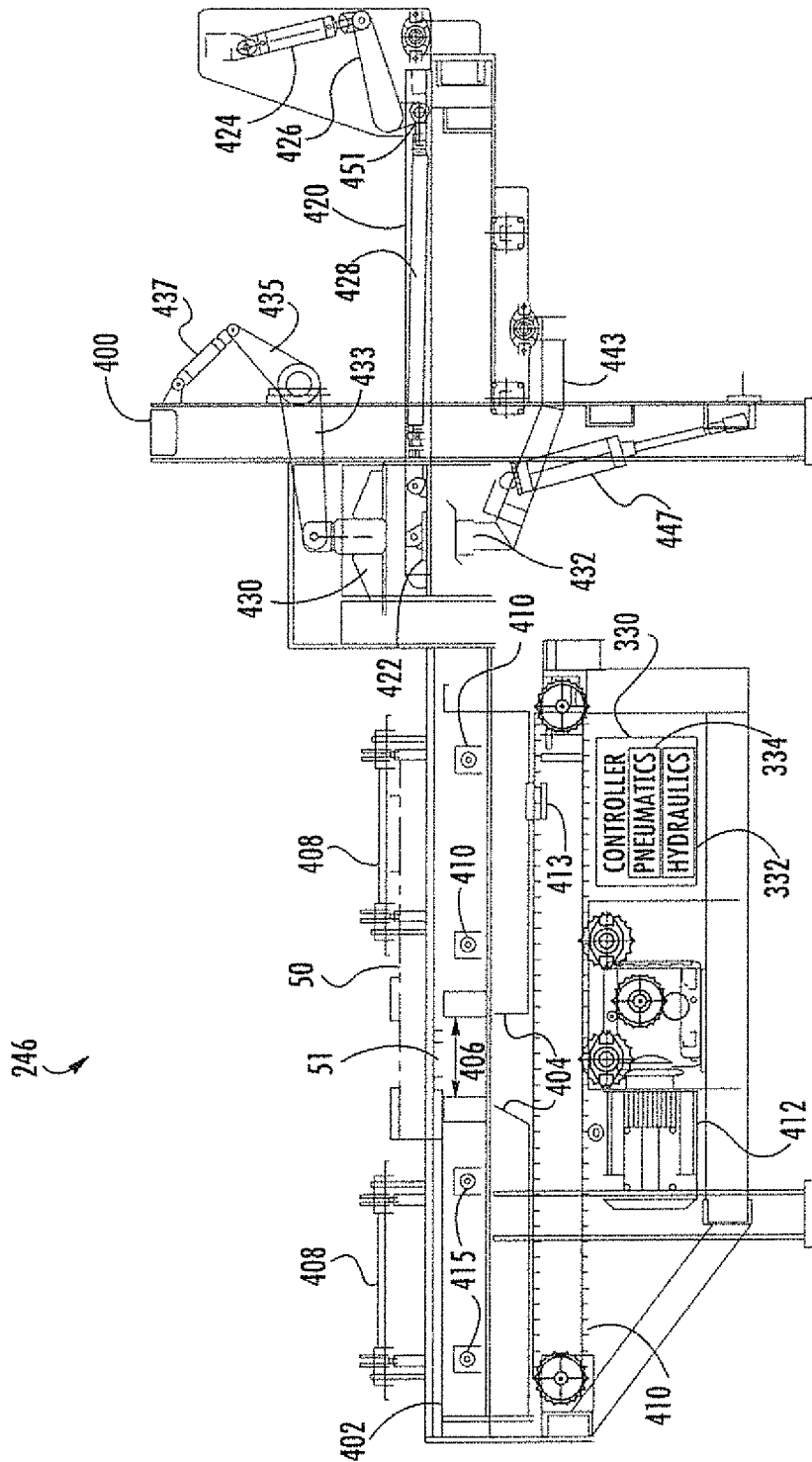
FIG. 17 is a side view of a board removal apparatus with a pallet in the pallet receiving position in accordance with the present invention.
Figure 18:
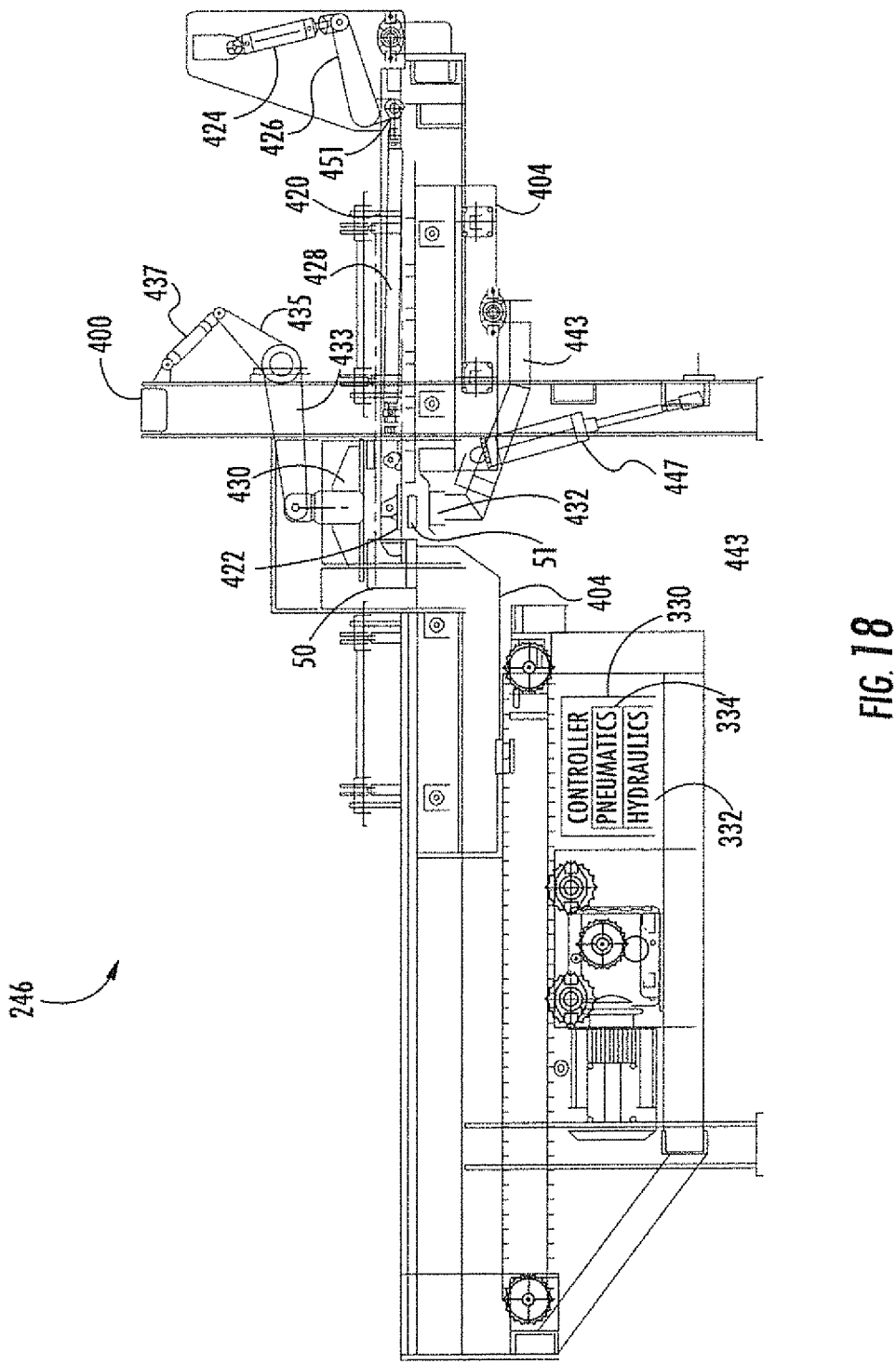
FIG. 18 is a side view of the board removal apparatus illustrated in FIG. 17 with the pallet in the board removal position.
Figure 19:
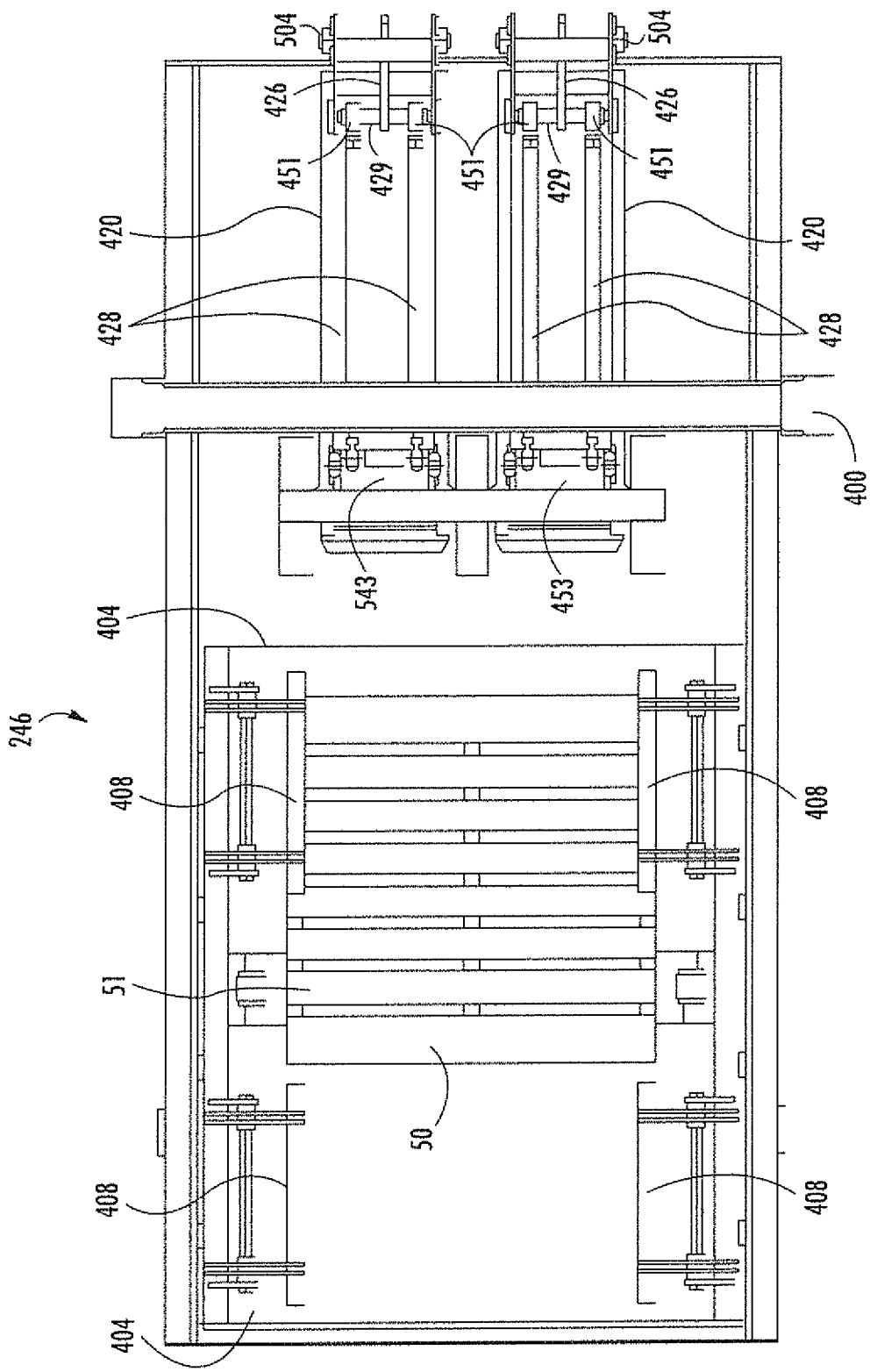
FIG. 19 is a top view of the board removal apparatus illustrated in FIG. 17.

Referring now to FIGS. 17, 18 and 19, the illustrated board removal apparatus 246 comprises a frame 400, and a carriage 402 carried by the frame. The carriage 402 comprises a pair of spaced apart tables 404 with a fixed gap 406 therebetween. The carriage 402 is movable between a pallet receiving position (FIGS. 17 and 19) and a board removal position (FIG. 18). The pallet 50 is positioned on the carriage 402 in the pallet receiving position so that a board 51 to be removed overlies the fixed gap 406. The width of the fixed gap 406 is greater than the width of the board 51 to be removed. In the illustrated embodiment, a chain drive 410 is used to move the carriage 402 under the control of an electrical motor 412 from the pallet receiving position to the board removal position. A chain to carriage attachment point is indicated by reference 413. Rollers 415 are carried by each table 404 for assisting with movement of the pallet 50 thereon.

Each table 404 has a clamping mechanism 408 associated therewith for securing the pallet 50 to the carriage 402. The clamping mechanisms 408 clamp along the outer edges of the pallet 50. Depending the placement of the pallet 50 on the carriage, the clamping mechanism 408 on one of the tables is sufficient for securing the pallet 50. The clamping mechanisms 408 may be pneumatically operated, as will be readily understood by those skilled in the art. However, other types of clamping mechanisms are acceptable for securing the pallet 50 to each table 404.

In the illustrated embodiment, a pair of board removal pad assemblies 420 is carried by the frame 400. Each board removal pad assembly 420 comprises at least one push rod 428 and at least one board removal foot pad 422 pivotally coupled thereto. In the illustrated embodiment, a pair of push rods 428 is pivotally coupled to a board removal foot pad 422. For each board removal pad assembly 420, the corresponding pair of push rods 428 and the board removal foot pad 422 are inserted between adjacent stringers when the carriage 402 is in the board removal position. The board removal foot pad 402 overlies at least a portion of the board 51 to be removed, and also overlies at least a portion of the fixed gap 406 between the pair of spaced apart tables 404. The removal pads 422 thus extend parallel to the fixed gap 406.

An upper support arm pad 430 is coupled to the frame 400 for resisting an upward force of the pallet 50 when the board removal foot pad 402 applies a board removal force for removing the board 51. The illustrated upper support arm pad 430 is pivotally coupled to the frame 400, and is locked into position prior to the board removal force being applied by the board removal foot pad 402. As a design alternative, the upper support arm pad 430 would be unnecessary if the frame 400 was strong enough to withstand the board removal force, i.e., a board lever force, generated by the board removal pad assemblies 420. The illustrated upper support arm pad 430 overlies the board removal foot pads 422. The upper support arm pad 430 is coupled to a pair of transfer links 433 and 435 for moving the upper support arm pad 430 up and down. An upper support arm actuator 437 for controlling movement of the upper support arm pad 422 is coupled between the frame 400 and one of the transfer links 435. The upper support arm actuator 437 locks the upper support arm pad 430 into position prior to the board removal force being applied by the board removal foot pad 402. The upper support arm actuator 437 may be hydraulically controlled, for example.

A lower support arm pad 432 is pivotally coupled to the frame 400 to provide a counter force on the board 51 to be removed as the board removal foot pads 422 apply a board removal force for removing the board. The counter force is less than the board removal force for maintaining the board 51 in a substantially horizontal position during removal thereof from the pallet 50. The lower support arm pad 432 is carried by an arm 443 that is pivotally coupled to the frame 400. A lower support arm actuator 447 for controlling the lower support arm pad 432 is coupled between the frame 400 and the arm 443. The lower support arm actuator 447 may be hydraulically controlled, for example.

Figure 22:
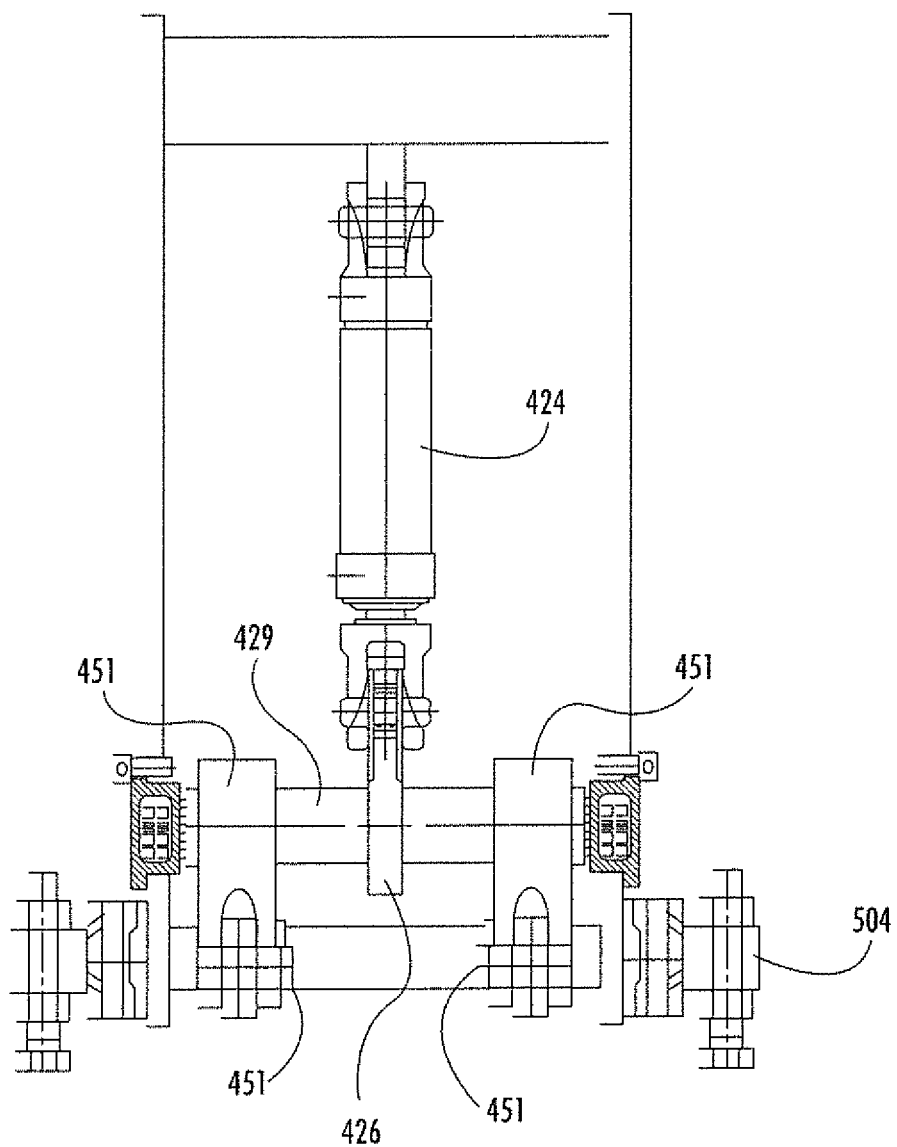
FIG. 22 is a more detailed rear view of one of the board removal assemblies illustrated in FIG. 19.

The board removal pad assemblies 420 will now be discussed in greater detail with reference to FIGS. 20, 21 and 22. Each board removal pad assembly 420 further comprises a push rod link pivotally coupled between an actuator 424 and the push rods 428. The push rod link includes a central arm 426 coupled to a shaft 429. The shaft 429 extends outward toward a pair of outer push rod arms 451. As the actuator 424 pushes on the central arm 426, the outer pair of push rod arms 451 transfers a board removal force to the respective push rods 428.

The push rods 428 in turn transfer the board removal force to the board removal foot pad 422 via a transfer plate 453. As the board 51 is removed, the transfer plate 453 pivots the board removal foot pad 422 and board to within the fixed gap 406 between the pair of spaced apart tables 404. Connection pins 455 are used to couple the push rods 428 to the transfer plate 453. Pivot pins through the support plate 453 cause it to rotate downwards when the board removal force is applied to the push rods 428.

Operation of the board removal apparatus 246 is based on a controller 330, which includes a hydraulics controller section 332 and a pneumatics controller section 334. For purposes of simplifying the drawings, interfaces between the controller sections 332, 334 and the corresponding hydraulic and pneumatic actuators 424, 437 and 447 are not shown, but will be readily understood by those skilled in the art.

The controller 330 may operate based on a processor for controlling the hydraulics controller section 332 and the pneumatics controller section 334. The controller 330 also controls movement of the carriage 402. The controller 330 operates in response to the repair recipe 78 generated by the FMS server 56 for the pallet 50. Alternatively, the controller 330 may be operated independently from the repair recipe 78 for removing a board 51 from the pallet 50, as will be appreciated by those skilled in the art.

Each board removal assembly 420 has a floating end 500, and a fixed end 502. The fixed end 502 is coupled to the frame 400 at connection points 504. The floating end 500 is tapered so that it can more easily be inserted between adjacent stringers on the pallet 50. As the free end 500 of the board removal foot pads 422 apply the board removal force for removing the board 51, the upper surface of the fixed end 502 contacts and pushes upwards on the inside of the pallet 50.

As noted above, the lower support arm pad 432 is pivotally coupled to the frame 400 to provide a counter force on the board 51 to be removed as the board removal foot pads 422 apply the board removal force for removing the board. The lower support arm actuator 447 moves the lower support arm pad 432 within a range of about 30 to 60 degrees from the carriage 402 when the board 51 has been removed. This allows the removed board 51 to be readily discarded.

After the board 51 has been removed, the upper support arm 430 is unlocked and retracted, and the carriage 402 moves back to the pallet receiving position. The pallet clamps 408 are unclamped and the pallet 50 is removed or repositioned for removal of another board.

A method for removing a board 51 from a pallet 50 using a board removal apparatus 246 is also provided. The board removal apparatus 246 comprises a frame 400, and a carriage 402 carried by the frame and comprising a pair of spaced apart tables 404 with a fixed gap 406 therebetween. The carriage 402 is movable between a pallet receiving position and a board removal position. At least one board removal pad assembly 420 is carried by the frame 400 and includes at least one board removal pad 422 overlying at least a portion of the fixed gap 406 when the carriage 402 is in the board removal position.

Figure 23:
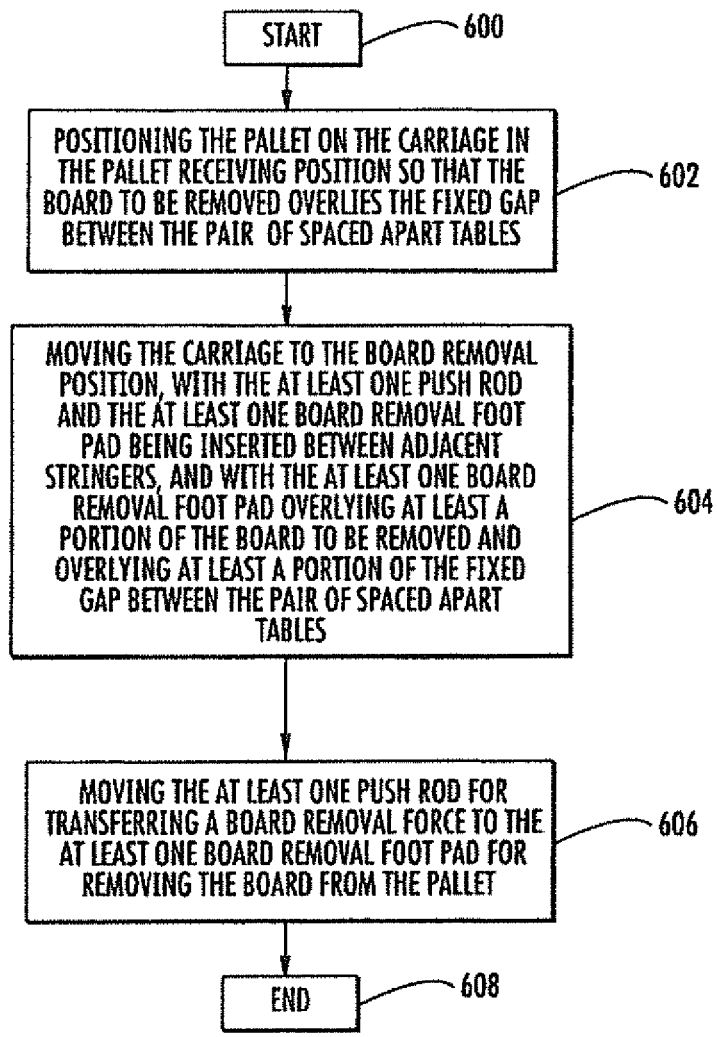
FIG. 23 is a flow diagram for removing a board from a pallet using a board removal apparatus in accordance with the present invention.

Referring now to FIG. 23, from the start (Block 600), the method comprises positioning the pallet 50 on the carriage 402 in the pallet receiving position so that the board 51 to be removed overlies the fixed gap 406 between the pair of spaced apart tables 404 at Block 602. The carriage is moved to the board removal position at Block 604. In this position, the at least one push rod 428 and the at least one board removal foot pad 422 are inserted between adjacent stringers. The at least one board removal foot pad 422 overlies at least a portion of the board 51 to be removed, and also overlies at least a portion of the fixed gap 406 between the pair of spaced apart tables 404. The at least one push rod 428 is moved at Block 606 for transferring a board removal force to the at least one board removal foot pad 422 for removing the board 51 from the pallet 50. The method ends at Block 608.

In the illustrated board removal apparatus 246, the carriage 402 is moved with the pallet 50 thereon with respect to the stationary pair of board removal pad assemblies 420. Alternatively, the carriage 402 with the pallet 50 thereon may be stationary and the pair of board removal pad assemblies 420 is movable with respect to the carriage, as will be readily appreciated by those skilled in the art.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included as readily appreciated by those skilled in the art.

That which is claimed:

1. A method for removing a board from a pallet using a board removal apparatus comprising a frame, a carriage carried by the frame and comprising a pair of spaced apart tables with a fixed gap therebetween, the carriage being movable between a pallet receiving position and a board removal position, the pallet comprising a plurality of spaced apart stringers and a plurality of boards on top and bottom surfaces thereof, and at least one board removal assembly carried by the frame and comprising at least one push rod and at least one board removal foot pad pivotally coupled thereto, the method comprising:

positioning the pallet on the carriage in the pallet receiving position so that the board to be removed overlies the fixed gap between the pair of spaced apart tables;

moving the carriage to the board removal position, with the at least one push rod and the at least one board removal foot pad being inserted between adjacent stringers, and with the at least one board removal foot pad overlying at least a portion of the board to be removed and overlying at least a portion of the fixed gap between the pair of spaced apart tables; and moving the at least one push rod for transferring a board removal force to the at least one board removal foot pad for removing the board from the pallet.

2. The method according to claim 1 wherein the board removal apparatus further comprises an upper support arm pad coupled to the frame for resisting an upward force of the wooden pallet when the at least one board removal foot pad applies the board removal force for removing the board.

3. The method according to claim 1 wherein the board removal apparatus further comprises a lower support arm pad pivotally coupled to the frame to provide a counter force on the board to be removed as the at least one board removal foot pad applies a board removal force for removing the board, with the counter force being less than the board removal force.

4. The method according to claim 3 wherein the counter force is for maintaining the board in a substantially horizontal position during removal thereof from the pallet, and after the board has been removed from the pallet, the at least one lower support arm pad moves within a range of about 30 to 60 degrees for discarding the removed board.

5. The method according to claim 1 wherein the at least one board removal assembly further comprises at least one transfer plate pivotally coupled between the at least one board removal foot pad and the at least one push rod for transferring the board removal force to the at least one board removal foot pad, with the at least one transfer plate pivoting the at least one board removal foot pad to within the fixed gap between the pair of spaced apart tables.

6. The method according to claim 5 wherein the at least one push rod comprises a pair of push rods coupled to the at least one transfer plate.

7. The method according to claim 1 wherein the at least one board removal assembly has a floating end and a fixed end coupled to the frame, with the floating end including the at least one board removal foot pad.

8. The method according to claim 1 wherein the at least one board removal assembly comprises a pair of spaced apart board removal assemblies, with each board removal assembly inserted between different adjacent stringers when the carriage is in the board removal position.

9. The method according to claim 1 wherein the lower support arm pad is inserted in the fixed gap between the pair of spaced apart tables for contacting the board to be removed when the carriage is in the board removal position.

10. A method for removing a board from a pallet using a board removal apparatus comprising a frame, a carriage carried by the frame and comprising a pair of spaced apart tables with a fixed gap therebetween, the carriage being movable between a pallet receiving position and a board removal position, the pallet comprising a plurality of spaced apart stringers and a plurality of boards on top and bottom surfaces thereof, and at least one board removal assembly carried by the frame and comprising at least one push rod and at least one board removal foot pad coupled thereto, the method comprising:

positioning the pallet on the carriage in the pallet receiving position so that the board to be removed overlies the fixed gap between the pair of spaced apart tables;

moving the carriage to the board removal position, with the at least one push rod and the at least one board removal foot pad being inserted between adjacent stringers; and moving the at least one push rod for transferring a board removal force to the at least one board removal foot pad for removing the board from the pallet.

11. The method according to claim 10 wherein the board removal apparatus further comprises an upper support arm pad coupled to the frame for resisting an upward force of the wooden pallet when the at least one board removal foot pad applies the board removal force for removing the board.

12. The method according to claim 10 wherein the board removal apparatus further comprises a lower support arm pad coupled to the frame to provide a counter force on the board to be removed as the at least one board removal foot pad applies a board removal force for removing the board, with the counter force being less than the board removal force.

13. The method according to claim 10 wherein the counter force is for maintaining the board in a substantially horizontal position during removal thereof from the pallet, and after the board has been removed from the pallet, the at least one lower support arm pad moves within a range of about 30 to 60 degrees for discarding the removed board.

14. The method according to claim 10 wherein the at least one board removal assembly further comprises at least one transfer plate coupled between the at least one board removal foot pad and the at least one push rod for transferring the board removal force to the at least one board removal foot pad, with the at least one transfer plate moving the at least one board removal foot pad to within the fixed gap between the pair of spaced apart tables.

15. The method according to claim 14 wherein the at least one push rod comprises a pair of push rods coupled to the at least one transfer plate.

16. The method according to claim 10 wherein the at least one board removal assembly has a floating end and a fixed end coupled to the frame, with the floating end including the at least one board removal foot pad.

17. The method according to claim 10 wherein the at least one board removal assembly comprises a pair of spaced apart board removal assemblies, with each board removal assembly inserted between different adjacent stringers when the carriage is in the board removal position.

18. The method according to claim 10 wherein the lower support arm pad is inserted in the fixed gap between the pair of spaced apart tables for contacting the board to be removed when the carriage is in the board removal position.

* * * * *

UNITED STATES PATENT AND TRADEMARK OFFICE
CERTIFICATE OF CORRECTION

| | | |
|---|---|---|
| PATENT NO. | : 8,595,909 B2 | Page 1 of 1 |
| APPLICATION NO. | : 13/543181 | |
| DATED | : December 3, 2013 | |
| INVENTOR(S) | : Townsend et al. | |

It is certified that error appears in the above-identified patent and that said Letters Patent is hereby corrected as shown below:

In the Claims:

Delete: "claim 10"

Column 14, Line 27    Insert: -- claim 12 --

Signed and Sealed this
Twenty-fifth Day of February, 2014

Michelle K. Lee
*Deputy Director of the United States Patent and Trademark Office*